United States Patent
Proucelle

[11] 3,980,511
[45] Sept. 14, 1976

[54] MANUFACTURE OF PRODUCTS HAVING HIGH ACOUSTIC INSULATING CHARACTERISTICS

[75] Inventor: Bernard Marie Jean Proucelle, Creil, France

[73] Assignee: Saint-Gobain Industries, Neuilly-Sur-Seine, France

[22] Filed: July 14, 1972

[21] Appl. No.: 271,667

[30] Foreign Application Priority Data
July 23, 1971 France .............................. 71.26994

[52] U.S. Cl. .......................... 156/62.4; 156/79; 156/498; 156/499; 264/45.3; 264/DIG. 60; 428/297; 428/310; 428/313
[51] Int. Cl.² ........................................ B32B 17/02
[58] Field of Search ...... 161/151, 159, 170, DIG. 4; 156/78, 79, 624; 264/45, 51, 57, 45.3, DIG. 60; 428/297, 310, 313

[56] References Cited
UNITED STATES PATENTS

| | | | |
|---|---|---|---|
| 2,943,949 | 7/1960 | Petry | 156/78 |
| 2,961,332 | 11/1960 | Nairn | 156/78 |
| 2,964,799 | 12/1960 | Roggi et al. | 156/79 |
| 2,972,554 | 2/1961 | Muskat et al. | 161/159 |
| 3,050,427 | 8/1962 | Slayter et al. | 156/78 |
| 3,172,072 | 3/1965 | Willy | 161/159 |
| 3,239,365 | 3/1966 | Petry | 156/78 |
| 3,257,252 | 6/1966 | Keel | 156/79 |
| 3,423,273 | 1/1969 | Mazur | 156/79 |
| 3,433,700 | 3/1969 | Migdol et al. | 156/79 |
| 3,709,752 | 1/1973 | Wistozky | 156/79 |

*Primary Examiner*—James J. Bell
*Attorney, Agent, or Firm*—Samuel Lebowitz

[57] ABSTRACT

The production of composite structural products having high sound-proofing characteristics by impregnating a mat of fibers of substantial length with an organic thermoplastic resin containing an expanding agent, and thereafter heating the treated mat. The resin is partially jelled during the initial stage of heating and the expanding agent is dissociated during the later stage of the heating, which results in a controlled swelling of resin while the resin completes the jelling thereof while the product attains its predetermined density. Upon the cooling of the material it is transformed from a plastic to an elastic state, especially in the direction of thickness of the product.

6 Claims, 8 Drawing Figures

MANUFACTURE OF PRODUCTS HAVING HIGH ACOUSTIC INSULATING CHARACTERISTICS

It is the object of the present invention to provide a method of obtaining products having high sound-proofing qualities, particularly against shock or impact noises and which have good dimensional stability, except in the direction of thickness, in which case they are flexible.

The inventive method contemplates the use of mineral or organic fibers having high resistance to traction, particularly glass fibers, immersed in a thermoplastic resin, in particular, a polyvinyl resin such as plasticized polyvinyl chloride.

It is an essential characteristic of the invention that one begins with a pad or mat of entangled or matted fibers which are not joined together and which are uniformly impregnated with resin containing an expanding agent. This mat is then subjected to heating, whereupon the mat expands freely under the swelling action of the resin at atmospheric pressure, and the material is cooled after it has acquired its predetermined density, said material then passing from the plastic to the elastic state.

According to another characteristic of the invention, the initially fabricated mat is constituted of entangled fibers in superposed planes, these fibers not being joined to one another during heating, while permitting a controlled expansion in the direction of thickness while limiting all expansion in transverse directions. These fibers are preferably at least 50 cm. long.

According to another characteristic of the invention, the first heating operation takes place, in the course of which the resin is partially jelled, then a second heating operation serves to cause the dissociation or decomposition of the expanding agent and the termination of the jellification of the resin.

Other characteristics and purposes of the invention will appear from the following description thereof, taken in conjunction with the accompanying drawings, wherein.

The products obtained by the method in accordance with the invention all have the common characteristic of possessing high sound-proofing qualities and great dimensional stability while being flexible in the direction of their thickness. The appearance and mechanical properties of these products may be varied by modifying the following parameters: weight of the fibers, weight of the plastic materials, concentration of the expanding agent, and the concentration of the plasticizer.

According to one mode of executing the invention, the predetermined density of the product is caused to vary by varying the quantity and nature of the expanding agent. According to another working method, the degree of elasticity or suppleness of the product is made to vary by modifying the quantity of the plasticizer which is incorporated in the resin. The impregnation of the fibers by the resin can be accomplished by any appropriate method, and in particular by immersion, by spraying or atomizing, by flowing over weirs, or by a combination of these.

1. Impregnation by immersion or dipping

Figure 1:
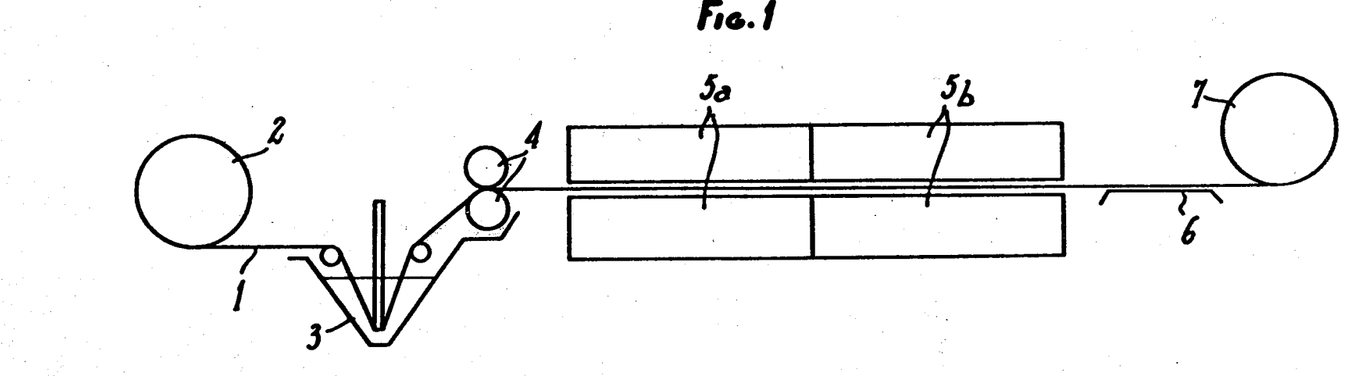
FIGS. 1 to 4 are front elevations of different layouts for impregnating the fiber mats with the resin compositions in accordance with the invention and the subsequent treatments thereof.

The mode of execution of this method is illustrated in FIG. 1 of the drawings. A sheet of fibers 1, for example, glass fibers which are not connected, is unwound from a roll 2 and passes into a vat or tank 3 containing the resin, such as polyvinyl chloride, and the additional expanding agent. Upon leaving this vat, the impregnated sheet is dried and calendered by passage between calendering rolls 4. It is then advanced into a continuous oven or drying chamber comprising two consecutive parts 5a,5b. In the first part 5a of this oven, the sheet is brought to a temperature close to 140°C. and the polymer begins to jellify. The time of passage of the sheet in the first part is about 2 minutes. In the second part 5b of the drying chamber, the temperature is raised to a range of 180°C. to 200°C. At this stage and the time required for the passage of the sheet therethrough is substantially the same, namely, approximately 2 minutes. The expanding agent is dissociated or decomposed and the resultant gas forms pores in the body of the mass while the jellification is completed. Upon leaving the drying chamber, the composite structure, which has reached its definitive dimensions, is cooled either by natural heat exchange with the surrounding air, or by a forced convection device 6. It is then wound on roll 7 or cut into plates.

In order to fabricate special products, it is possible to stop the heat-drying of the composite structure immediately after the first phase of jellification. The expansion agent not being decomposed and the resin being incompletely jellified, the expansion and the completion of the jellification may be realized in a repeated operation, for example, after the addition of a surface coating.

2. Impregnation by atomization or spraying

Figure 2:
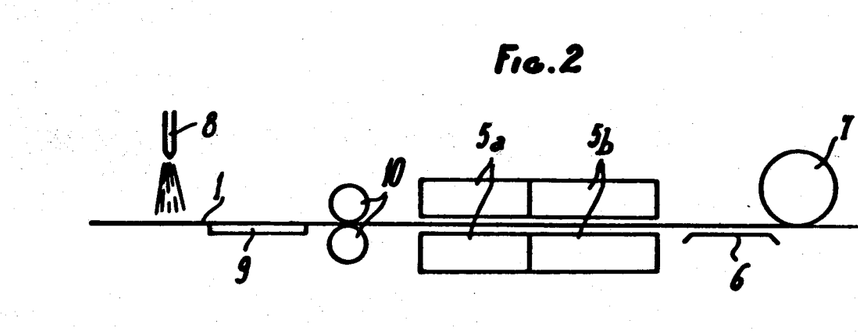

In the method of executing the invention illustrated in FIG. 2, the sheet of fibers 1 passes in front of one or more spray guns 8 which spray or atomize the resin on said sheet with the expansion additives. A suction device 9 assures the distribution of the resin solution through the body of the fibers and regulates its surface mass. Calendering rolls 10 may complete the distribution of the resin in the fibrous mass. The treatment of the composite structure then proceeds as in the immersion process described above.

Figure 3:
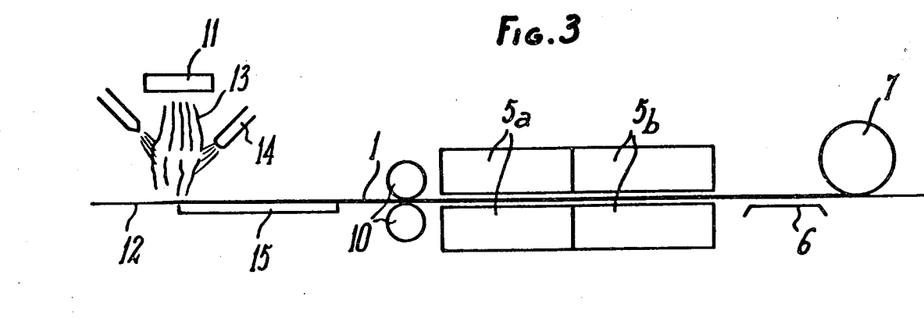

In the variant embodiment shown in FIG. 3, the spraying of the resin and the expansion additives is effected by means of spray guns 14 acting directly on the fibers 13 issuing from the fibering device 11. The fibers thus impregnated are received on a travelling net or band 12 passing over a suction device 15, to form a pad or mat 1 which is subjected to the same treatments as described above.

3. Impregnation by overflowing across weir or spillway

Figure 4:
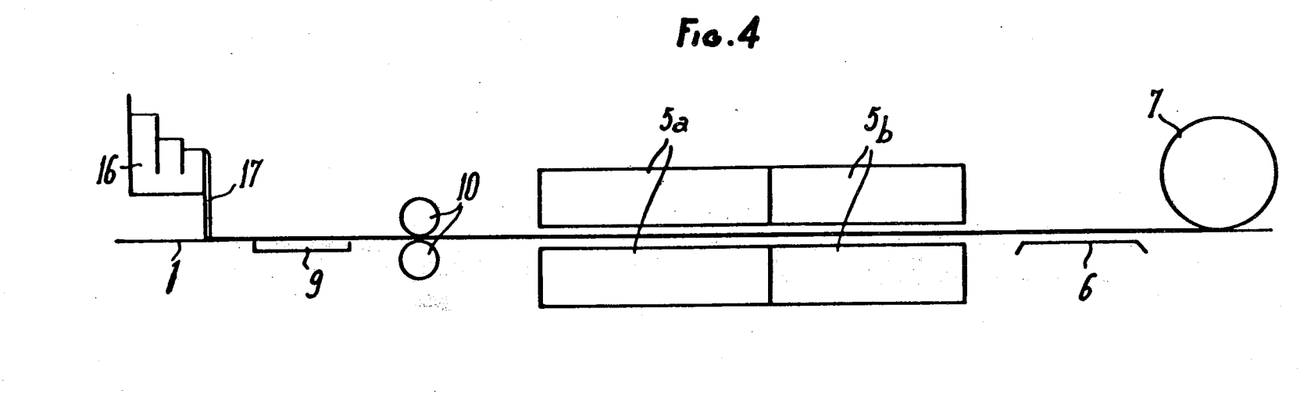

This method of executing the invention, illustrated in FIG. 4, is analogous to that shown in FIG. 2 with this difference, that the one or more spray guns are replaced by an overflow tank 16 with a screen or curtain 17, over which the plasticized resin with the expansion agent flows onto the sheet of fibers 1.

Below are given two examples of compositions for executing the process according to the invention:

EXAMPLE 1

| | |
|---|---|
| Polymerized polyvinyl chloride in emulsion | 100 parts by weight |
| Ethyl phthalate - 2 hexyl | 100 parts by weight |
| Azodicarbonamide | 1.7 parts by weight |
| Potassium stearate and zinc stearate (with, partially, tribasic lead sulfate) | 1.5 to 2 parts by weight |
| Dyes or coloring matter (possibly) | in sufficient quantity |

EXAMPLE 2

| | |
|---|---|
| Polymerized polyvinyl chloride in emulsion | 100 parts by weight |
| Ethyl phthalate - 2 hexyl | 60 parts by weight |
| Azodicarbonamide | 1.7 parts by weight |
| Potassium and zinc stearate (with, partially, tribasic lead stearate | 1.5 to 2 parts by weight |
| Dyes or colorants | in sufficient quantity, as required |

The viscosity of the principal mixtures can be adjusted, as needed, with the help of a solvent such as kerosene KSO:

| | |
|---|---|
| Density at 15°C. | 0.780 |
| Flash point 80°C. | Aniline point 81.5°C. |
| Distillation: | beginning 195°C. - final point 255°C. |

Such products as described above have, at one and the same time, a high resistance to elongation and rupture in the direction of length and breadth, and a great elasticity in the direction of thickness. Thus, when the product is produced with 200 grams of glass fibers per square meter and 874 grams of polyvinyl chloride expanded according to Example 1, it has a resistance to rupture by traction of 8 kg. per cm. for a relative elongation $\Delta L/L$ of 2.5%. On the other hand, this product remains very pliable and elastic during compression.

Figure 5:
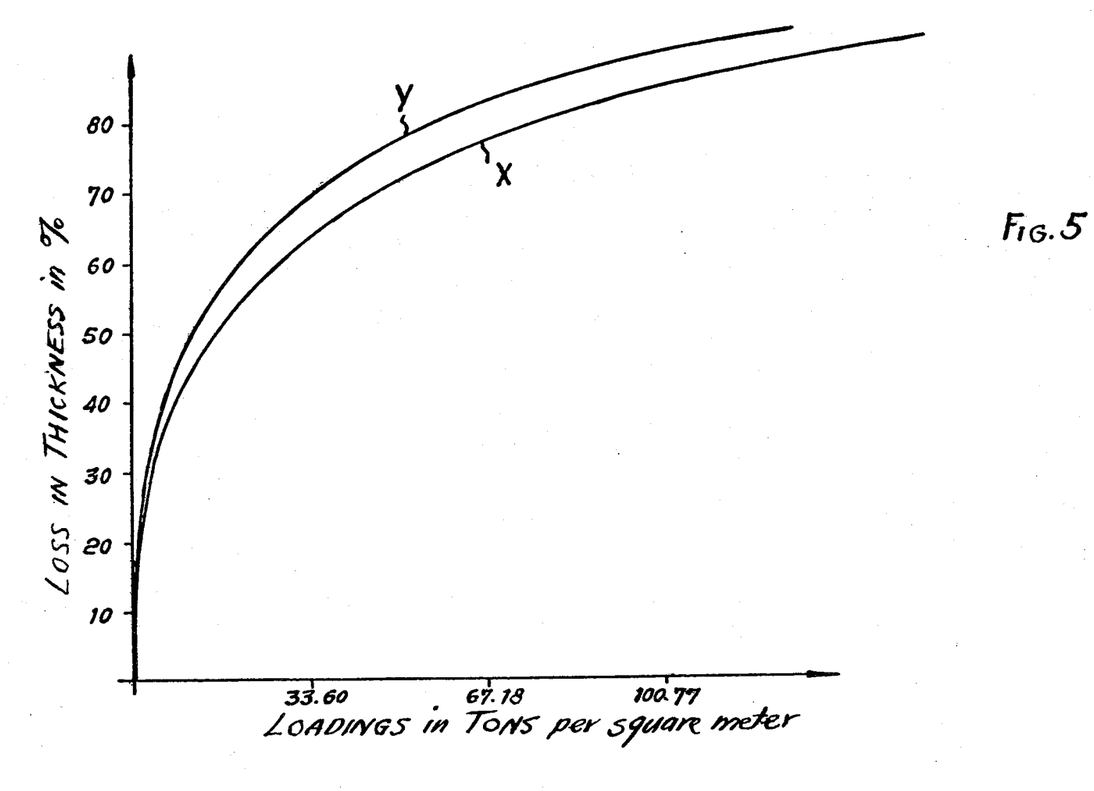
FIG. 5 is a graph showing the pliable compressibility characteristics of fiber mats in accordance with the invention.

FIG. 5 shows a graphical representation of the property of this same product in curve X, which portrays the percentage decrease in thickness of the product as a function of the loading. By way of proof, a comparison curve Y is shown which portrays the percentage loss in thickness of a sheet of polyvinyl chloride foam without fibrous reenforcement of the same density as the above-mentioned product. It is evident that the elasticity of the product according to the invention remains very close to that of the comparative product represented by curve Y.

The products obtained by the procedures of the invention are capable of numerous applications, particularly the following: as coverings or sheathings for floors, walls, ceilings, in the form of panels, bands or the like assuring sound-proofing of buildings. As underlayers, in association with coverings of floors, walls, or ceilings. These coverings may be of a textile nature, for example, needled velvet pile upholstery fabric in the form of small squares, tiles or diamonds. The use of these underlayers contributes to the improvement in comfort in walking, and increases in high proportion the insulation against impact noises. The junction between the underlayers and coverings may be effected by countergluing or by gluing the juxtaposed surfaces.

Figure 6:
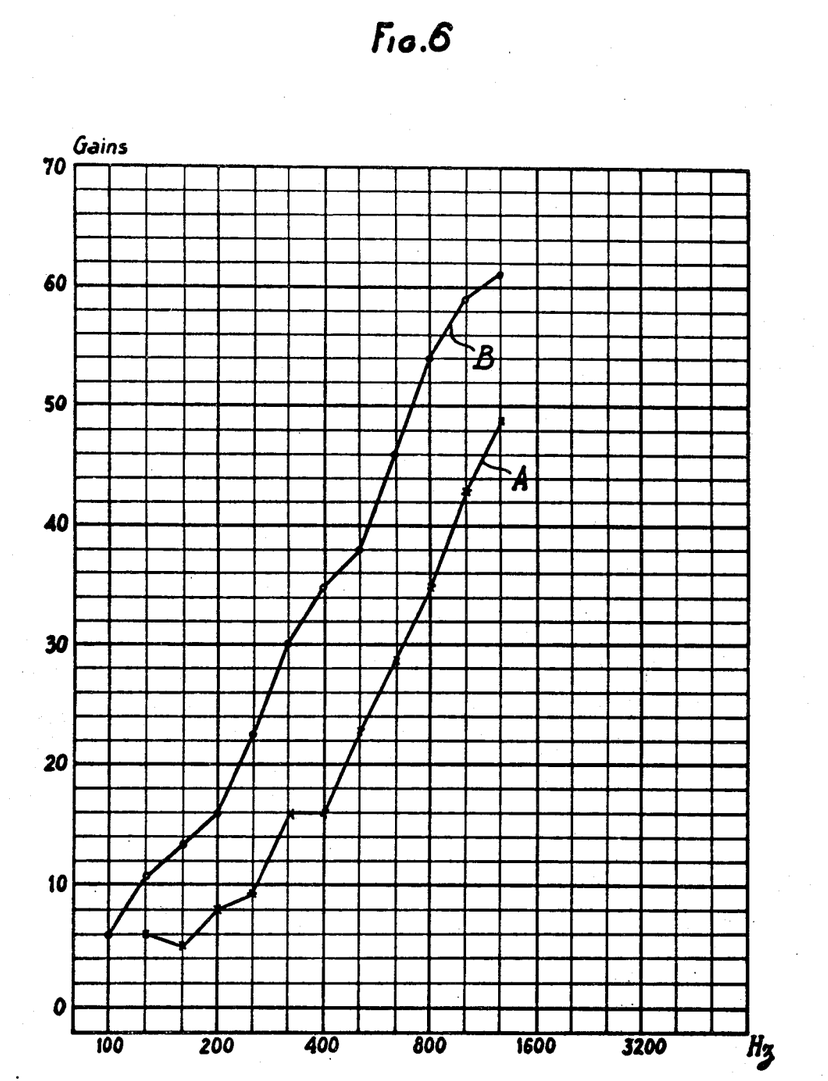
FIGS. 6 to 8 are graphs showing the improvements in sound insulating characteristics of fiber mats in accordance with the invention.

FIG. 6 portrays the comparative improvements in sound-proofing or acoustic insulation against impact or shock noises of different materials as a function of the acoustic frequencies in cycles per second, which are represented as absiccas on the graph. The ordinates represent gains or improvements in noise levels resulting from the use of these different materials when compared with the noise resulting from the shocks when the machine producing such is placed on a slab of bare concrete. Thus, curve A shows the difference in noise levels resulting from the use of a needled covering of super-polyamide with felt alone, as against curve B which results from the same covering glued to an underlayer in accordance with the invention, this underlayer having a surface mass of 1 kg. per square meter with 200 grams per square meter of Verranne type glass fibers. Thus, as may be seen from FIG. 6, the gain in the muting or deadening of shock noises of 800 cycles per second, for example, by the use of the composite structures in accordance with the invention over sheathings without such structures in approximately 19 decibels.

The products according to the invention may be associated, in particular, with the composite structures of mineral fibers and thermoplastic materials disclosed in U.S. Pat. No. 3,658,633, Apr. 25, 1972.

The products of the invention may be used as underlayers in association with coverings, particularly rigid flooring, such as ceramic sandstone, glass block, parquet flooring, etc. Thus, floors having resilient properties are attained. Gluing of the rigid covering is effected by means of mastic, or pliable or rigid adhesives.

Figure 7:
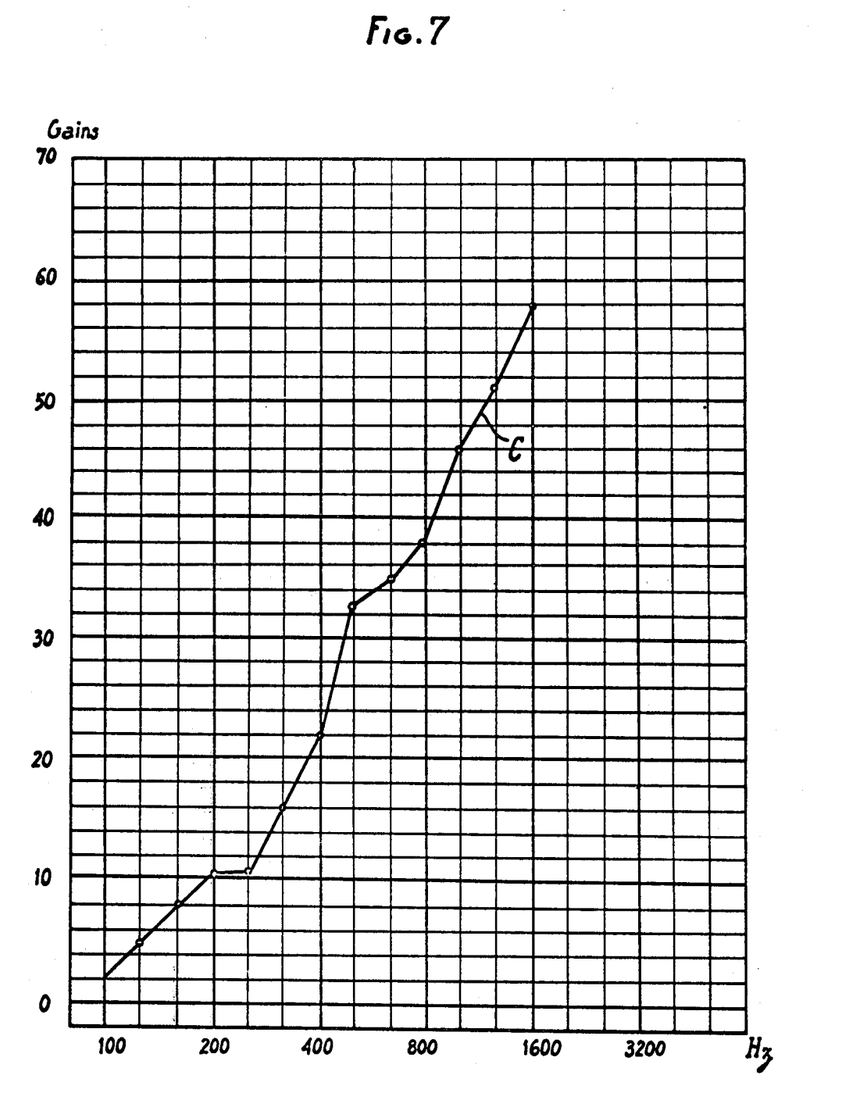

The curve C in FIG. 7 illustrates the gain in sound-proofing against impact noises of a ceramic facing glued to an underlayer in accordance with the invention having a surface mass of 1.5 kg. per square meter with 200 grams per square meter of Verranne type glass fibers.

Figure 8:
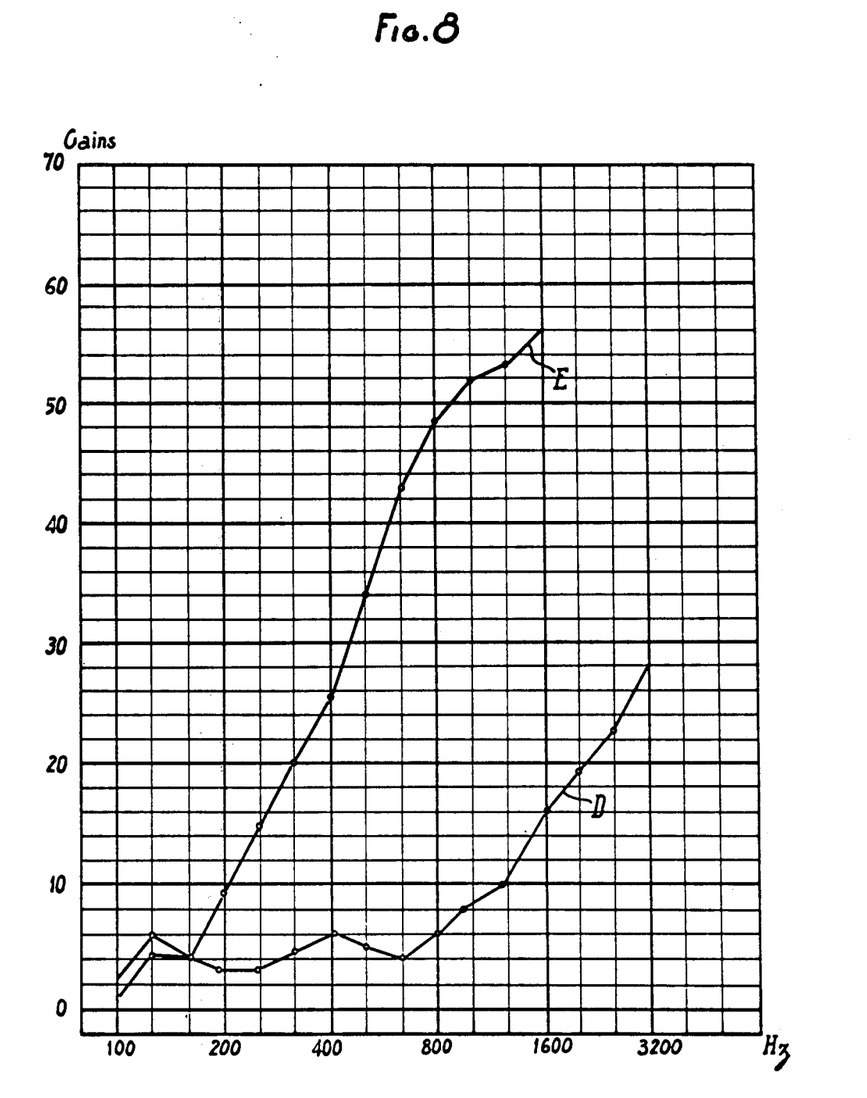

The products of the invention may be used as underlayers in association with vinyl coated facings. The vinyl facing may be applied on an underlayer by counter-gluing or direct coating. The resulting product then presents excellent properties from the point of view of insulation against impact noises, as is shown by curves D and E in FIG. 8. Curve D illustrates the muted gains derived from a vinyl coating applied to an underlayer of felt, and curve E shows the gains obtained when the same coating is glued to an underlayer in accordance with the invention, having a surface mass of 1 kg. per square meter with 200 grams per square meter of Verranne glass fibers.

The products according to the invention may also be utilized as expansion joints for buildings, as insulators for pipes or conduits, for the production of packing, antivibrating or cushion layers, etc. They may also be utilized for sound-proofing vehicles. In the latter case, they can be molded as needed to attain the desired shapes. They also may be associated with layers having decorative surfaces, as in the case of floors, walls, and ceilings.

I claim:

1. The method of manufacture of products having highly improved sound insulating properties, particularly impact noises, derived from mats of interlaced glass fibers having a high tractive resistance and which are impregnated with a plasticized polyvinyl chloride resin composition containing an expanding agent which is subject to decomposition by heat, which comprises a. providing a mat of separated glass fibers, the majority of which are of a length of approximately 50 cm., free of any adhesive therebetween but only entangled between superposed planes, b. impregnating the mat uniformly through its thickness with a plasticized polyvinyl chloride resin containing an expanding agent, c. initially heating the impregnated mat at atmospheric pressure and at a temperature of approximately 140°C., for about 2 minutes, for partially jelling the plasticized thermoplastic resin within the whole of the mat, d. secondarily heating the mat, in which the resin is partially jellified, at a temperature of approximately 180° to 200°C., for about two minutes, to complete the jellification of the resin and to permit a free expansion of the resin within the mat, the fibers of the superposed layers of the mat being still separated from each other in the course of the heating, to effect a substantially uniform distribution thereof and a controlled expansion of the mat in the direction of its thickness while limiting its expansion in transverse directions, and e. cooling the composite mat upon its reaching a predetermined density as it passes from a plastic to an elastic state, with stable dimensions except in the direction of its thickness which is flexible.

2. The method set forth in claim 1, which includes the step of compressing the mat, constituted by superposed layers of the interlaced glass fibers, following the impregnation and prior to the heating thereof, for removing the excess liquid therefrom, thereby to control the ultimate density of the product.

3. The method set forth in claim 2, which includes varying the quantity and nature of the expanding agent as a function of the desired predetermined density of the final product.

4. The method set forth in claim 3, which includes the addition of a predetermined amount of a plasticizer to the resin to control the degree of elasticity of the product.

5. The method set forth in claim 1, wherein the plasticized resin composition with the added expanding agent is of the following formulation:

| | |
|---|---|
| Polymerized polyvinyl chloride in emulsion | 100 parts by weight |
| Ethyl phthalate - 2 hexyl | 100 parts by weight |
| Azodicarbonamide | 1.7 parts by weight |
| Potassium stearate and zinc stearate (with, partially, tribasic lead sulfate) | 1.5 to 2 parts by weight |
| Dyes or coloring matter (possibly) | in sufficient quantity. |

6. The method set forth in claim 1, wherein the plasticized resin composition with the added expanding agent is of the following formulation.

| | |
|---|---|
| Polymerized polyvinyl chloride in emulsion | 100 parts by weight |
| Ethyl phthalate - 2 hexyl | 60 parts by weight |
| Azodicarbonamide | 1.7 parts by weight |
| Potassium and zinc stearate (with, partially, tribasic lead stearate) | 1.5 to 2 parts by weight |
| Dyes or colorants | in sufficient quantity, as required. |

* * * * *

UNITED STATES PATENT AND TRADEMARK OFFICE
CERTIFICATE OF CORRECTION

PATENT NO. : 3,980,511
DATED : September 14, 1976
INVENTOR(S) : BERNARD MARIE JEAN PROUCELLE It is certified that error appears in the above—identified patent and that said Letters Patent are hereby corrected as shown below:

Column 2, line 20, "At this stage" is cancelled, and a comma is inserted therefor.

Column 2, line 23, "The" is cancelled and --At this stage, the-- is substituted therefor.

Signed and Sealed this

Thirtieth Day of November 1976

[SEAL]

Attest:

RUTH C. MASON
*Attesting Officer*

C. MARSHALL DANN
*Commissioner of Patents and Trademarks*